(12) United States Patent
Alsheuski

(10) Patent No.: US 9,380,215 B2
(45) Date of Patent: Jun. 28, 2016

(54) SYSTEM OPTICAL MAGNIFICATION CHANGE WITHOUT IMAGE QUALITY DETERIORATION OR REDUCTION

(71) Applicant: Aliaksandr Alsheuski, Vilneus (LT)

(72) Inventor: Aliaksandr Alsheuski, Vilneus (LT)

(73) Assignee: JSC Yukon Advanced Optics Worldwide, Vilneus (LT)

( * ) Notice: Subject to any disclaimer, the term of this patent is extended or adjusted under 35 U.S.C. 154(b) by 0 days.

(21) Appl. No.: 14/635,944

(22) Filed: Mar. 2, 2015

(65) Prior Publication Data
US 2015/0288888 A1    Oct. 8, 2015

(30) Foreign Application Priority Data
Mar. 3, 2014    (EP) .................................... 14157457

(51) Int. Cl.
*H04N 5/262*    (2006.01)
*H04N 5/232*    (2006.01)
*G02B 23/12*    (2006.01)
*F41G 1/32*    (2006.01)
*F41G 1/38*    (2006.01)

(52) U.S. Cl.
CPC ............ *H04N 5/23296* (2013.01); *G02B 23/12* (2013.01); *H04N 5/23229* (2013.01); *H04N 5/23293* (2013.01); *F41G 1/32* (2013.01); *F41G 1/38* (2013.01)

(58) Field of Classification Search
USPC ...................................... 348/240.2
See application file for complete search history.

*Primary Examiner* — Roberto Velez
*Assistant Examiner* — Stephen Coleman
(74) *Attorney, Agent, or Firm* — Fish & Richardson P.C.

(57) ABSTRACT

In an implementation, a computer-implemented method includes receiving a digital signal from an image acquisition sensor, the digital signal encoded with an initial resolution. A video image is constructed from the digital signal to display on a micro display of an optical system, an initial linear dimension of the video image smaller than a linear dimension of an active area of the micro display. A display of the video image is initiated on the micro display using monochrome sub-pixels configured to act as independent pixels for display of the video image. A magnification request is received for the video image on the micro display, and the video image is adjusted on the micro display by increasing a linear dimension of the video image on the micro display by combining groups of monochrome sub-pixels to collectively represent a single pixel of the video image at the initial resolution.

20 Claims, 6 Drawing Sheets

SYSTEM OPTICAL MAGNIFICATION CHANGE WITHOUT IMAGE QUALITY DETERIORATION OR REDUCTION

This application claims priority under 35 USC §119(a) to European Application Serial No. 14157457.4, filed on Mar. 3, 2014, the entire contents of which are hereby incorporated by reference.

BACKGROUND

Optical systems, for example those used in daylight and/or night vision-capable devices such as guidance system/firearm/weapon sights, tracking systems, telescopes, monoculars, binoculars, night viewing, and/or other devices, can convert optical images into digital images and add supplementary information (e.g., target data, time, ambient temperature, air humidity, wind velocity etc.) for display on a digital display, as well as allowing magnification of the digital image. Without increasing the size of the optical system/digital display, magnification (e.g., zooming) of digital images typically result in a resolution reduction of the digital image and a resultant deterioration of a frequency-contrast characteristic (FCC) for the optical system as a whole.

SUMMARY

The present disclosure describes magnification of a digital image without image quality deterioration or reduction.

In a first implementation, an optical system includes: a lens constructing an image of articles which are in a field-of-view of an image acquisition sensor which converts radiant energy into an electrical signal; electronic components associated with an image processing electronic board that converts the electrical signal from the image acquisition sensor into a digital signal; a micro display converting the digital signal into a video image displayed on the micro display, wherein micro-display pixel density is of a higher resolution than a resolution of acquisition sensor pixel density, and wherein each pixel of the micro display comprises a plurality of monochrome sub-pixels, the monochrome sub-pixels of a smaller size than pixels of the image acquisition sensor and the plurality of monochrome sub-pixels used by a matrix control system to increase the resolution of the micro display and to permit magnification of the video image displayed on the micro display without cropping the video image; and an eyepiece through which the video image from the micro-display image is projected.

Other aspects of this first implementation can include corresponding mechanical apparatuses and computer systems, as well as computer programs recorded on one or more non-transitory computer-readable media/storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein a linear dimension of the image acquisition sensor remains constant A second aspect, combinable with any of the previous aspects, wherein a sub-pixel diagonal dimension is two times smaller than a pixel diagonal dimension.

A third aspect, combinable with the general implementation, wherein a sub-pixel optimum minimum diagonal dimension is not more than 5 µm and a pixel cluster diagonal dimension is not more than 10 µm.

A fourth aspect, combinable with any of the previous aspects, wherein the micro display can be switch from using a 5 µm sub-pixel to using a 10 µm pixel in order to permit continued magnification to an active area of the micro display.

A fifth aspect, combinable with the general implementation, wherein each monochrome sub-pixel can be used as a separate pixel or in combination with other monochrome sub-pixels to construct the video image.

A sixth aspect, combinable with any of the previous aspects, wherein the dimension of the video image is smaller in dimension than an active area of the micro display allocated for imaging.

A seventh aspect, combinable with any of the previous aspects, wherein the optical system is used as a sight in a guidance system, firearm, tracking system, telescope, monocular, or night viewing device.

An eighth aspect, combinable with any of the previous aspects, wherein a focal length between the eyepiece and a corresponding lens between the eyepiece and the micro display is fixed.

A ninth aspect, combinable with any of the previous aspects, wherein the eyepiece is configured to encompass a maximum linear field value associated with the micro display.

A tenth aspect, combinable with any of the previous aspects, wherein a digital signal corresponding to a pixel, can be switched to instead correspond with a particular sub-pixel.

In a second implementation, a computer-implemented method includes: receiving a digital signal encoded with an initial resolution, the digital signal constructed from visual data collected by an image acquisition sensor; constructing a video image from the digital signal to display on a micro display of an optical system, wherein an initial linear dimension of the video image is smaller than a linear dimension of an active area of the micro display allocated for imaging; initiating display of the video image on the micro display, wherein the video image is displayed using a plurality of monochrome sub-pixels configured to act as independent pixels for display of the video image, each monochrome sub-pixel a smaller size than a pixel of the image acquisition sensor and each monochrome sub-pixel associated with a group of other monochrome sub-pixels that form a single pixel on the micro display; receiving a magnification request for the video image on the micro display; adjusting the video image on the micro display using a matrix control system, the matrix control system increasing a linear dimension of the video image on the micro display by combining groups of monochrome sub-pixels of the plurality of monochrome sub-pixels where each group of monochrome sub-pixels collectively represents a single pixel of the video image at the initial resolution; and projecting the adjusted video image through an eyepiece.

Other aspects of this second implementation can include corresponding mechanical apparatuses and computer systems, as well as computer programs recorded on one or more non-transitory computer-readable media/storage devices, each configured to perform the actions of the methods.

A first aspect, combinable with the general implementation, wherein overall micro-display pixel density is of a higher resolution than a resolution of image acquisition sensor pixel density.

A second aspect, combinable with the general implementation, wherein the linear dimension of the image acquisition sensor remains constant.

A third aspect, combinable with the general implementation, wherein a sub-pixel diagonal dimension is two times smaller than a pixel diagonal dimension.

A fourth aspect, combinable with the general implementation, wherein a sub-pixel optimum minimum diagonal dimension is not more than 5 µm and a pixel cluster diagonal dimension is not more than 10 µm.

A fifth aspect, combinable with the general implementation, comprising switching the micro display from using a 5 µm sub-pixel to using a 10 µm pixel in order to permit continued magnification to an active area of the micro display.

A sixth aspect, combinable with the general implementation, wherein a focal length between the eyepiece and a corresponding lens between the eyepiece and the micro display is fixed.

A seventh aspect, combinable with the general implementation, wherein the eyepiece is configured to encompass a maximum linear field value associated with the micro display.

An eighth aspect, combinable with the general implementation, comprising switching the digital signal corresponding to a pixel to instead correspond with a particular sub-pixel to reduce video image size.

A system of one or more computers can be configured to perform particular operations or actions of the first and/or second implementations (and/or other aspects of the first and/or second implementations) by virtue of having software, firmware, hardware, or a combination of software, firmware, or hardware installed on the system that in operation causes or causes the described optical system to perform the actions. One or more computer programs can be configured to perform particular operations or actions by virtue of including instructions that, when executed by data processing apparatus, cause the apparatus to perform the actions.

The subject matter described in this specification can be implemented in particular implementations so as to realize one or more of the following advantages. First, an optical image received by an optical system can be converted into a digital image and magnified (e.g., zoomed) without deterioration or reduction of the digital image—that is preserving the digital image resolution. Second, the digital image can be magnified as described without the overall dimensions (including weight) of the optical system increasing. Third, the magnification functionality can be performed using a micro display (e.g., a liquid crystal display (LCD), organic light emitting diode (OLED), or other type of micro display) with resolution higher than a resolution of a charge-coupled device (CCD) light-sensitive area that captures an optical image. The use of the micro display can save weight and overall power consumption as part of the optical system. Fourth, the described optical system and magnification technique can be used on both daylight and night vision-capable devices, extending the usefulness of the devices into situations where ambient light is naturally fading (e.g., at dusk/sunset/predawn) or when entering a no-light (or low-light) environment (e.g., a building with no lights, moonless/cloudy night, in woods/jungle, etc.). Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
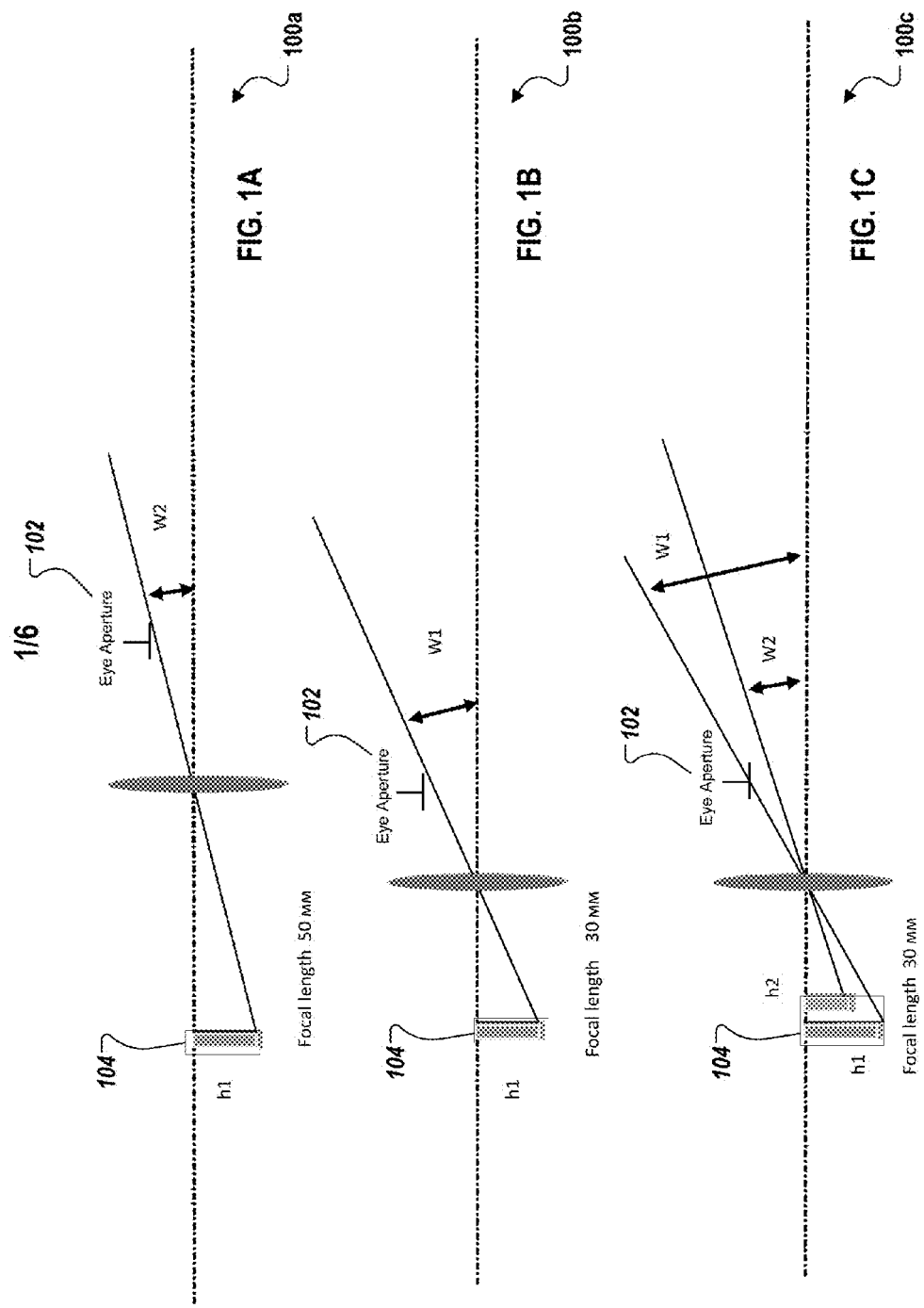
FIGS. 1A-1C are diagrams illustrating how an angular field-of-view (FOV) of an eyepiece changes by changing an image linear dimension of an image on a micro display according to an implementation.

The following detailed description and/or illustration(s) are presented to enable any person skilled in the art to make, use, and/or practice the disclosed subject matter and are provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations, but is to be accorded the widest scope consistent with the principles and features disclosed herein.

Optical systems, for example those used in daylight and/or night vision-capable devices such as guidance system/weapon sights, tracking systems, telescopes, monoculars, binoculars, and/or other devices, can convert optical images into digital images and add supplementary information (e.g., target data, time, ambient temperature, air humidity, wind velocity etc.) for display on a digital display, as well as allowing magnification of the digital image. Without increasing the size of the optical system/digital display, magnification (e.g., zooming) of digital images typically result in a resolution reduction of the digital image and a resultant deterioration of a frequency-contrast characteristic (FCC) for the optical system as a whole.

Overall magnification ($\Gamma$) in a digital optical system is typically expressed by the following equation (ratio):

$$\Gamma = \frac{f'_l}{f'_e} * \frac{d_d}{d_{CDD}} = \frac{w_l}{w_e}$$

where:
$f'_l$—the lens focal length,
$f'_e$—the eyepiece focal length,
$d_d$—the image linear dimension on the display,
$d_{CCD}$—the image linear dimension of CCD,
$w_l$—the lens angle, and
$w_e$—the eyepiece angle.

A change of one term of the equation causes a change of magnification for the system (Γ). As will be appreciated by those of ordinary skill in the art, variations of the above-described equation are possible and are considered to be within the scope of this disclosure wherever consistent with the described subject matter.

Two methods are typically used to change parameters in magnification (Γ) of a received optical image of a target object:

Optical magnification systems—magnification is based on changing the lens ($f'_1$) or eyepiece ($f'_e$) focal length of an optical system, allowing magnification (Γ) changes generally not deteriorating an FCC of the optical system. Image linear dimensions of the optical system with an image acquisition sensor (e.g., a charge-coupled device (CCD)) and on the micro display remain invariable and are used for full resolution images. The optical system typically has a complicated mechanism, assembly, and production, which influences overall cost and weight of the optical system. In other words, the better the resolution, the larger the dimensions and the higher the weight of the optical system. This can be detrimental for some applications, for example using a heavy weapon sight on personnel carried firearms—a heavier optical system requires additional physical training and can negatively influence overall firearm aiming/accuracy.

Figure 3:
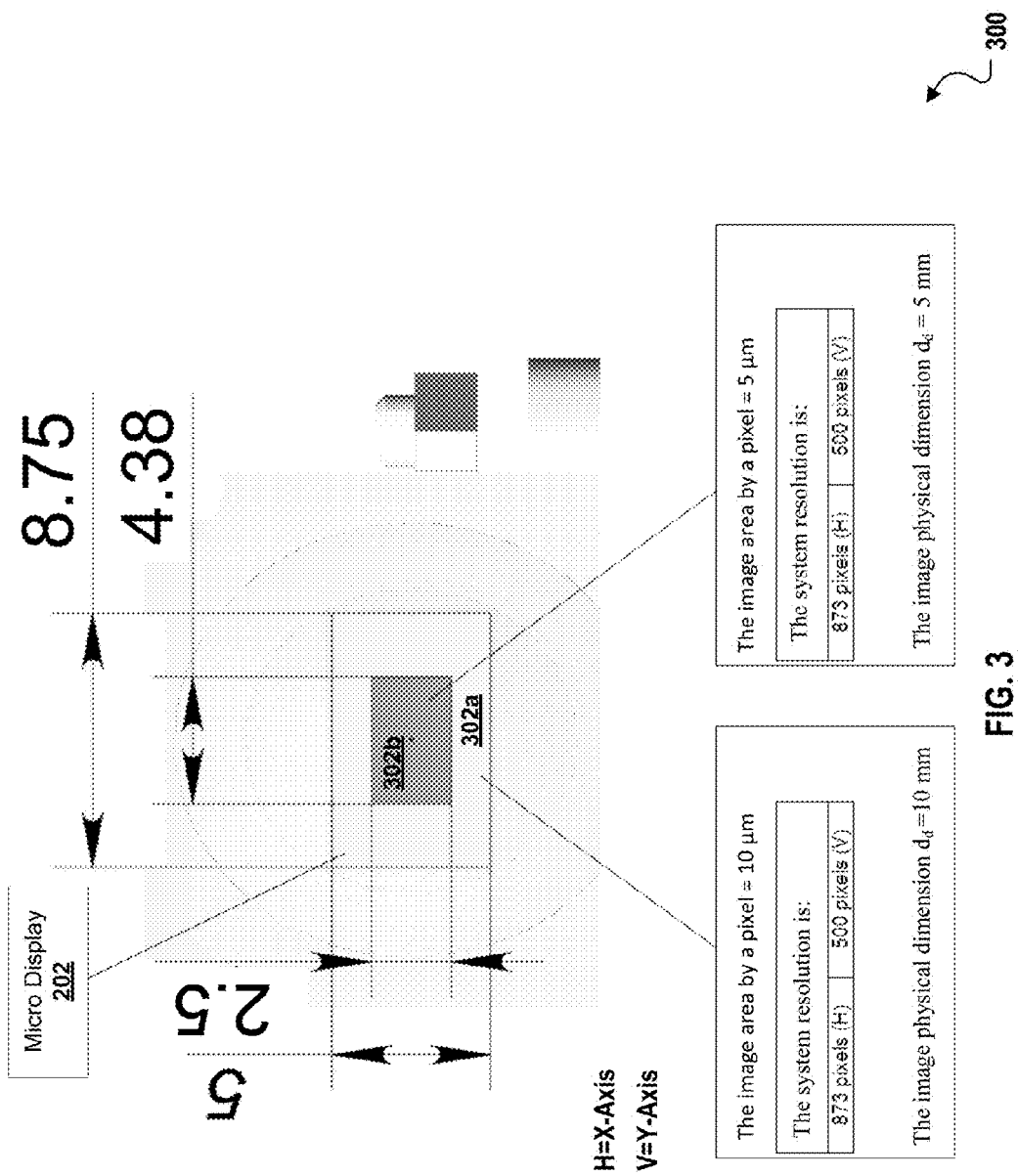
FIG. 3 is a diagram illustrating an exemplary micro-display image scaling change that preserves resolution of an image according to an implementation.
Figure 4:
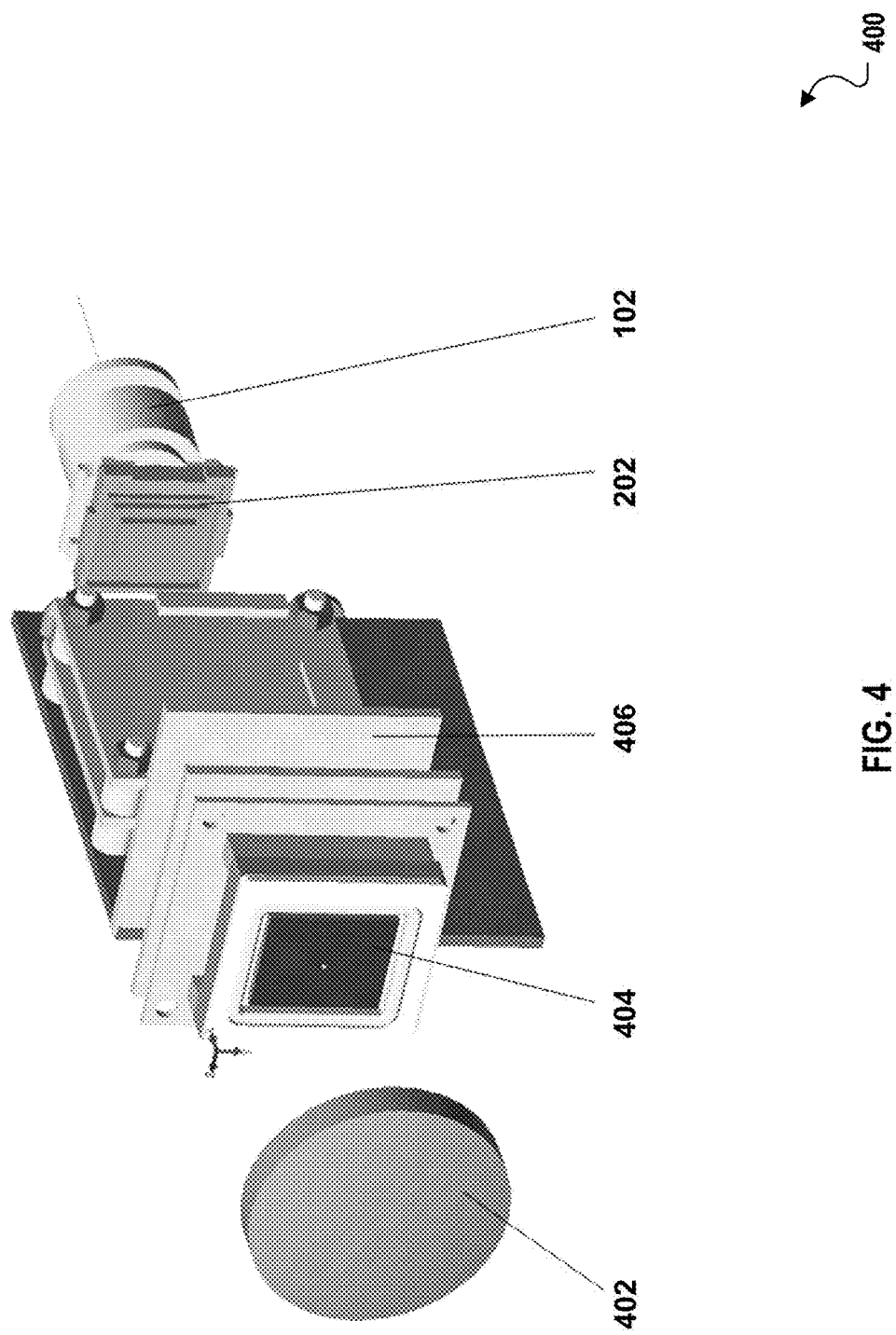
FIG. 4 illustrates an exemplary optical system according to an implementation.

Digital magnification systems—As a lens and an eyepiece typically have a fixed focal length in a digital optical system, magnification changes are normally provided by changing a physical dimension of a diagonal ($d_d$) (see FIG. 3) of the sensitive area of an image acquisition sensor (e.g., a CCD matrix, a microbolometric (infrared image sensor) matrix, or other image acquisition sensor type) (see FIG. 4). As an example with a CCD image acquisition sensor, assume the image linear dimension ($d_{ccd}$) of the CCD sensitive area is transferred (stretched) for the $d_d$ so that the magnification factor is a difference of two times (2×). This results in resolution reduction (deterioration) which in turn causes a reduction of the FCC of the system as a whole. For example, if a CCD matrix is 640×480 pixels and a micro-display matrix is 640×480, and the pixel size on the micro display and on the CCD matrix is 10 μm (micrometers/microns), to perform total magnification by 2×, the image linear dimension on the CCD is reduced by 2×. This CCD linear dimension reduction results in a CCD resolution reduction to a matrix of 320×240 while the micro-display linear dimension remains the same (640×480). Displaying a reduced resolution image (320×240) on the micro display (which is capable of a possible 640×480 resolution) demonstrates evidence of whole optical system resolution deterioration (FCC reduction).

Existing patent disclosures demonstrate that the above-described image quality problem with digital magnification functionality has not been resolved. For example:

International Patent Application No. WO2012061154 A1, published on May 10, 2012, describes a target guidance optical system with a processor collecting and processing information about a target and placing a scale grid over an image in the center of a display. The described design is quite large and cumbersome in terms of overall dimensions. As optically-focused instruments and devices (using lenses and support apparatus to manipulate a received optical image) typically have a higher overall weight when compared to a digital system, such an optical system can be more difficult to use in particular applications (e.g., fielded with weapon systems, such as firearms or aerial applications such as a drone aircraft). WO2012061154 A1 also fails to solve the problem of optical system compactness and sighting simplicity and the above-described image quality problem.

U.S. Patent Publ. No. US2010095578 A1, published on Apr. 2, 2010, considers a lightweight and compact sight for a firearm. The described sight has both optical and digital components and functionality to activate a grid display on a screen is emphasized. US2010095578 A1, however, does not address the above-described image quality problem.

Chinese Patent Application No. CN202793179, published on Mar. 13, 2013, considers a problem of target adjustment depending on external parameters (e.g., wind velocity, target distance, ambient temperature, and/or air humidity). The described device is equipped with different sensors/indicators and a microprocessor which estimates a target deviation from a grid central dot and displays a dot at which one should aim to be on a target. All data is represented on a micro-display screen in real time and in text format, but CN202793179 does not address the above-described image quality problem.

European Patent Application No. EP2180714, published on Apr. 28, 2010, considers issues of the image transfer to a display matrix, dot (pixel) displacement in the display matrix, and image transfer to a micro display. There is also description of monochrome (green) dot processing and sub-pixel image decomposition, but system magnification (Γ) without image quality deterioration is not considered. Weight of the described optical system is also not considered.

At a high level, the described optical system and computer-implemented method modify the image linear dimension of an image on the micro display and not an image linear dimension on the image acquisition sensor. The modification of the image linear dimension of an image on the micro display allows for a combination of several pixels as one pixel when magnifying the image (i.e., it allows a sub-pixel to operate as a pixel (using a larger number of elements/dots for imaging). As a result, the resolution of the image remains the same (e.g., as in the example above with the micro-display resolution of 640×480), but the micro display's pixel dimension is changed. In typical implementations, it is necessary that an eyepiece associated with the optical system (see FIGS. 1 and 3) allows visibility of the micro display's maximum linear field in order to not artificially (mechanically) reduce the visible image during a micro-display maximum magnification setting.

In typical implementations, the micro display has a resolution higher than a resolution of the image acquisition sensor. In typical implementations, a particular pixel of the micro display includes four sub-pixels. In an ordinary color micro display, each of the four sub-pixels supplies a different color which is mixed to obtain an overall color for the particular pixel. Multiple pixels associated with the color micro display are used together to form a displayed color image. To implement the described magnification of a digital image without image quality deterioration or reduction, the disclosure describes the use of a monochrome (e.g., green or other single color) pixel with four monochrome sub-pixels (e.g., see FIG. 2). Each sub-pixel can also be separately used as an individual monochrome pixel through a matrix control system. As a result, micro-display resolution is increased by 2× and an image on the micro display can be magnified/zoomed without image quality deterioration or reduction. The use of a micro display with a resolution higher than a resolution of the image acquisition sensor permits the described functionality without addition of additional hardware and mitigates or eliminates an increase in an overall dimensional or weight increase to the optical system.

The present disclosure describes an optical system including a computer system and computer-implemented method for magnification of a digital image without image quality deterioration or reduction. The optical system is lightweight and compact and can be used in a multitude of applications, including daylight and/or night vision-capable devices such as guidance system/weapon sights, tracking systems, telescopes, monoculars, binoculars, and/or other devices.

FIGS. 1A-1C are diagrams 100a-100c illustrating how an angular field-of-view (FOV) of an eyepiece 102 changes by changing an image linear dimension (e.g., an X- or Y-axis value) of an image on a micro display 104 according to an implementation. For example, in FIG. 1B, at 30 mm focal length from the eyepiece 102, if the image linear dimension (h1) of an image on the micro display 104 is h1=8 mm, then the angular FOV of eyepiece 102 is $w_1$=15°. Note that if the focal length is changed to 50 mm (as in FIG. 1A) with the image linear dimension of the image on the micro display still at h1=8 mm, then the angular FOV of eyepiece 102 is w2=9°. FIG. 1C illustrates a wide-angle eyepiece 102 with a fixed focal length of 30 mm and demonstrates how an eyepiece 102 FOV angle can be changed without an eyepiece 102 focal length change. In FIG. 1C, if an image linear dimension of an image on the micro display 104 is h1=8 mm, then the angular FOV of eyepiece 102 is $w_1$=15°. However, if the image linear dimension changes to h2=4.8 mm, then the angular FOV of the eyepiece 102 is $w_2$=9°. Based on this principal, the result of changing a magnification in the optical system is practically identical to how magnification changes in a regular optically zooming eyepiece.

In light of particularly FIG. 1C, enlarging/reducing an image linear dimension of an image on the micro display 104 allows a change in optical system magnification while not changing the eyepiece 102 FOV angle as the eyepiece 102 lens FOV angle is a constant. There is also no reduction of an overall optical system FCC. The image resolution is not reduced regardless of the magnification step when magnifying/zooming the image on the micro display.

Use of the above-described micro-display sub-pixels (of a particular fixed size) typically allow an image to be adjusted in size (not to reduce/crop but to magnify the image). In a typical implementation (a standard mode), the above-described micro-display sub-pixels are sized at 5 μm (as part of an actual pixel sized at 10 μm) and are used as independent pixels to display an image at a default resolution on the micro display prior to a magnification request.

In some implementations, the level of magnification for an image can vary depending, for example, on optical system available memory, software version(s), and/or mathematical functions/processing used for the image data. In some implementations, when the optical system reaches a 2× magnification, the optical system can switch to a default 10 μm pixel size (treating a normally individual pixel as a subpixel as part of a larger group of pixels) and continue magnification of an active area (e.g., the optical system can provide selection tools for particular areas on the micro-display) on the micro display. The original image data can be accessed to reset and display the image using the default 5 μm micro-display sub-pixels in a non-magnified state.

When in the above-described standard mode, an image minimum dimension without quality deterioration is reached when using the sub-pixels of the micro display as individual pixels. Note that if a dimension for the image on the micro display is set to be smaller than the image minimum dimension, quality deterioration of the image can result because there are no smaller sub-pixels to act as individual pixels and reducing the size of the image obtained from the image acquisition sensor can result in cropping of the displayed image.

Referring to Table 1, Table 1 below illustrates a micro-display axis resolution when using either pixels of 10 μm or sub-pixels of 5 μm as individual pixels. In some implementations, a micro display of type MDP01A (included in Table 1) or other micro display type can be used. For example:

TABLE 1

Micro-Display Resolution when Using Sub-Pixels

| Micro Display | Resolution with 10 μm Pixel Dimension | | Resolution with 5 μm pixel Dimension (a sub-pixel) | |
|---|---|---|---|---|
| | X-Axis Native Resolution | Y-Axis Native Resolution | X-Axis Maximum Resolution | Y-Axis Maximum Resolution |
| MDP01A | 873 pixels | 500 pixels | 1,746 pixels | 1,000 pixels |

Referring to Table 2, Table 2 below illustrates an image physical dimension when using either pixels of 10 μm or sub-pixels of 5 μm as individual pixels at the resolutions described above in Table 1.

TABLE 2

Image Physical Dimension when Using Sub-Pixels

| Micro Display | Image Physical Dimension with 10 μm Pixel | | Image Physical Dimension with 5 μm Pixel (a sub-pixel) | |
|---|---|---|---|---|
| | X-Axis Native Resolution | Y-Axis Native Resolution | X-Axis Maximum Resolution | Y-Axis Maximum Resolution |
| MDP01A | 8.73 mm | 5.00 mm | 8.73 mm | 5.00 mm |

Figure 2:
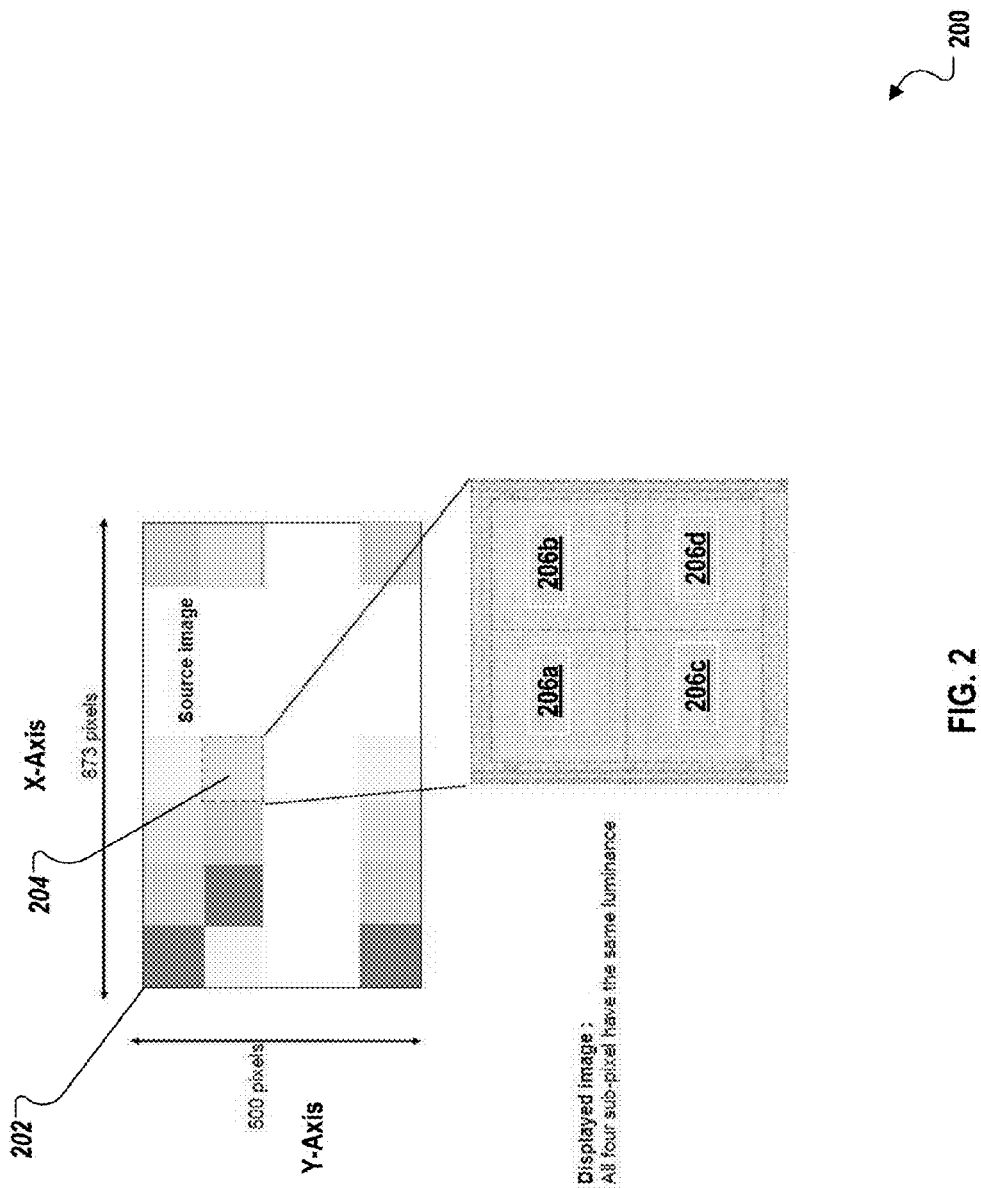
FIG. 2 is a diagram illustrating an example pixel/sub-pixel relationship according to an implementation.

FIG. 2 is a diagram 200 illustrating an example pixel/sub-pixel relationship according to an implementation. As illustrated, a micro display 202 includes multiple standard pixels 204 (here 873×500 pixels). Each pixel 204 includes a cluster of four sub-pixels (206a-206d) of monochrome color (e.g., green, yellow, or other color). In some implementations, it is possible to switch/transfer a digital signal from each of four pixels to each of four sub-pixels. Doing so causes a physical image reduction by 2×. A lack of color can result due to the transfer of the digital signals to the sub-pixels, but this is not a problem for all applications (e.g., night viewing devices).

An image is transferred to the micro-display 202 from an image acquisition sensor (e.g., a CCD) (not illustrated) matrix in full resolution where data retrieved from each pixel of the image acquisition sensor matrix is set to a definite monochrome sub-pixel. As a result, the image displayed on the micro display 202 possesses the image acquisition sensor matrix resolution (remains invariable) and the possible image physical dimensions are increased by 2×.

Note that one peculiarity of the described optical system is a mathematical apparatus (e.g., software and hardware) which can scale an image on a micro display not only by 2×. In some implementations, it is possible to set a digital magnification with a definite step, making digital magnification less than 2×. The ability to configure the optical system to operate in this manner depends, at least in part, on image acquisition sensor characteristics (e.g., resolution) and whether an image can be transferred to the micro display without resolution deterioration when using the full resolution of the image acquisition sensor (e.g., available resolution of the micro display, etc.).

FIG. 3 is a diagram 300 illustrating an exemplary micro-display image scaling change that preserves resolution of an image according to an implementation. For example, micro display 202 with full linear dimensions 302a of 8.75 mm×5 mm ($d_d$=10 mm) is shown where an image is displayed on the micro display 202 at either the full linear dimension of the micro display 202 or a reduced linear dimension (here 4.38 mm×2.5 mm ($d_d$=5 mm)). As can be seen, the image is displayed at 8.75 mm×5 mm when the image area by pixel is 10 µm (with a resultant resolution of 873 pixels horizontal (X-Axis) and 500 pixels vertical (Y-Axis)). When each pixel is reduced in size to 5 µm, the size of the displayed image retains the overall resolution of 873 pixels horizontal and 500 pixels vertical, but the size of the image is reduced to a footprint on the micro display of only 4.38 mm×2.5 mm. Either the full or reduced size image passes through an eyepiece (not illustrated—see FIG. 4) in the form of radiation in the visible spectrum into, for example, a human visual system.

FIG. 4 illustrates an exemplary optical system 400 according to an implementation. A lens 402 constructs the image of articles/objects which are in a FOV of the optical system 400 in a focal plane with an image acquisition sensor 404 (e.g., a CCD, microbolometer, and/or other image acquisition sensor with a constant linear dimension). In some implementations, the lens 402 is of fixed focal length.

In some implementations, the lens 402 can be configured of a material transparent to infrared (IR) or other particular radiation such as in thermal imaging systems, ultraviolet (UV) imaging systems, etc. In some implementations, the lens 402 can be configured of Germanium (Ge), quartz, AMTIER, barium fluoride, calcium fluoride, sodium chloride, CLEARTRAN, fused silica, silicon, polyethylene, IR transparent ceramics, and/or any other type of substance transparent to infrared (or other particular) electromagnetic radiation. In some implementations, the lens 402 can be made of a substance transparent to both optical, IR, and/or other radiation wavelengths (e.g., quartz, polyethylene, etc.). In some implementations, the lens 402 and image acquisition sensor 404 can be removed and replaced within an optical system 400 housing (not illustrated) to change overall functionality without needing a separate optical system 400. In some implementations, an lens 402 can be configured as part of an optical system housing, an attachment to the optical system housing, or be an integral part of the image acquisition sensor 404 (meaning that there may not be a separate lens 402—in which case, a window to desired forms of radiation can be used to protect the image acquisition sensor 404 in some implementations). In some implementations, the image acquisition sensor can also be zoomed (optically and/or digitally) to magnify received image data.

The image acquisition sensor 404 converts radiant energy (e.g. light in the visual spectrum, infrared light, etc.) into an electrical/analog signal (e.g., a signal is generated for each photo-detecting element in an element matrix of the image acquisition sensor 404). In some implementations, various electronic components 406 of the optical system 400 convert the above-mentioned electrical/analog signal into a digital signal using an image processing electronic board (e.g., hardware and/or software including mathematical conversion software.

The generated digital signal is projected on a micro display 202 as a video image with different electronic magnification factor functional capability. Pixel density of the micro display 202 is of a higher resolution than a resolution of a photo detecting pixel density of the image acquisition sensor 404. Each pixel of the micro display includes a plurality of monochrome sub-pixels (e.g., four sub-pixels), where the monochrome sub-pixels are of a smaller size (e.g., 2× smaller diagonally) than pixels of the image acquisition sensor and the plurality of monochrome sub-pixels are used by a matrix control system to increase the resolution of the micro display 202 and to permit magnification of the video image displayed on the micro display 202 without cropping the video image. Each monochrome sub-pixel can be used as a separate pixel or in combination with other monochrome sub-pixels to construct the video image to display on the micro display 202. In typical implementations, a digital signal corresponding to an image acquisition sensor pixel is switched to instead correspond with a particular sub-pixel of the micro display 202.

In typical implementations, a sub-pixel optimum minimum diagonal dimension is not more than 5 µm and a pixel cluster diagonal dimension is not more than 10 µm. In these implementations, the digital signal is converted into a video image using combinations of four sub-pixels (see FIGS. 2-3) of 5 µm in size to form, for example an image sized as 302b in FIG. 3. The dimension of the video image is then smaller in dimension than an active area of the micro display 202 allocated for imaging. In some implementations, the micro display 202 can also be switched from using a 5 µm sub-pixel to using a 10 µm pixel in order to permit continued magnification to an active area of the micro display 202.

Magnification functions as described above are available to adjust the displayed video image. The displayed video image can viewed using eyepiece 102. In typical implementations, the eyepiece 102 is configured to encompass a maximum linear field value associated with the micro display 202 and a focal length between the eyepiece 102 and a corresponding lens between the eyepiece 102 and the micro display 202 is fixed (see FIG. 1).

Figure 5:
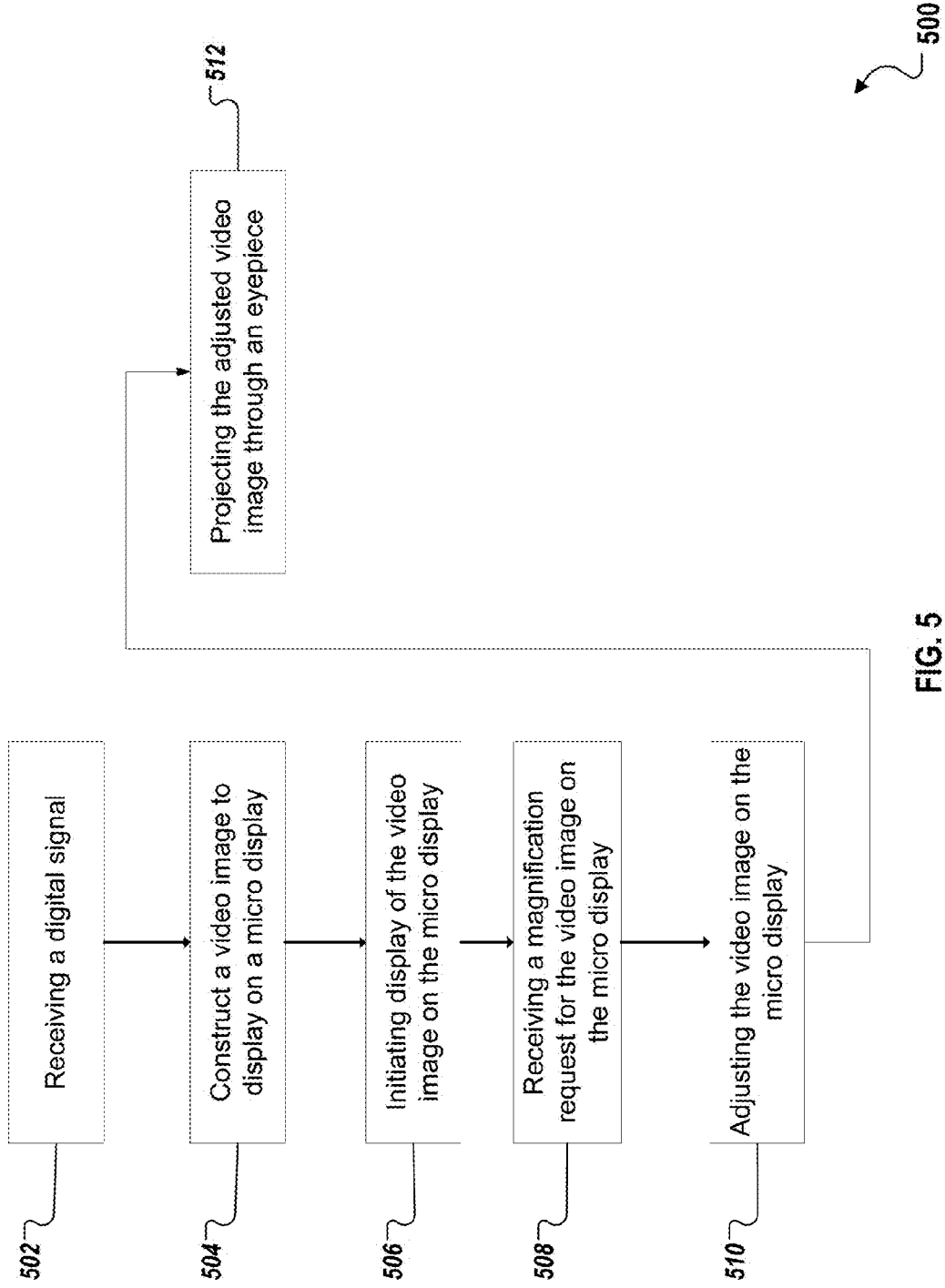
FIG. 5 is a flow chart of a method for magnifying a digital image without image quality deterioration or reduction according to an implementation.

FIG. 5 is a flow chart of a method 500 for magnifying a digital image without image quality deterioration or reduction according to an implementation. For clarity of presentation, the description that follows generally describes method 500 in the context of FIGS. 1A-1C, 2-4, and 6. However, it will be understood that method 500 may be performed, for example, by any other suitable system, environment, software, and hardware, or a combination of systems, environments, software, and hardware as appropriate. In some implementations, various steps of method 500 can be run in parallel, in combination, in loops, or in any order.

At 502, a digital signal encoded with an initial resolution is received. The digital signal is constructed from visual data collected by an image acquisition sensor. In typical implementations, the linear dimension of the image acquisition sensor remains constant. From 502, method 500 proceeds to 504.

At 504, a video image is constructed from the digital signal to display on a micro display of an optical system. Typically the initial linear dimension of the video image is smaller than a linear dimension of an active area of the micro display allocated for imaging. Typically the overall micro-display pixel density is of a higher resolution than a resolution of image acquisition sensor pixel density. From 504, method 500 proceeds to 506.

At 506, display of the video image is initiated on the micro display. Typically the video image is displayed using a plurality of monochrome sub-pixels configured to act as independent pixels for display of the video image, each monochrome sub-pixel a smaller size than a pixel of the image acquisition sensor and each monochrome sub-pixel associated with a group of other monochrome sub-pixels that form a single pixel on the micro display. Typically a sub-pixel diagonal dimension is two times smaller than a pixel diagonal dimension. From 506, method 500 proceeds to 508.

At 508, a magnification request is received for the video image on the micro display. From 508, method 500 proceeds to 510.

At 510, the video image is adjusted on the micro display using a matrix control system, the matrix control system increasing a linear dimension of the video image on the micro display by combining groups of monochrome sub-pixels of the plurality of monochrome sub-pixels where each group of monochrome sub-pixels collectively represents a single pixel of the video image at the initial resolution. Switching of the digital signal corresponding to a pixel to instead correspond with a particular sub-pixel reduces video image size on the micro display while preserving the overall image resolution. In some implementations, a sub-pixel optimum minimum diagonal dimension is not more than 5 µm and a pixel cluster diagonal dimension is not more than 10 µm. In some implementations, the micro display can be switched from using a 5 µm sub-pixel to using a 10 µm pixel in order to permit continued magnification to an active area of the micro display. From 510, method 500 proceeds to 512.

At 512, the adjusted video image is projected through an eyepiece. In typical implementations, the eyepiece is configured to encompass a maximum linear field value associated with the micro display and a focal length between the eyepiece and a corresponding lens between the eyepiece and the micro display is fixed. After 512, method 500 stops.

Figure 6:
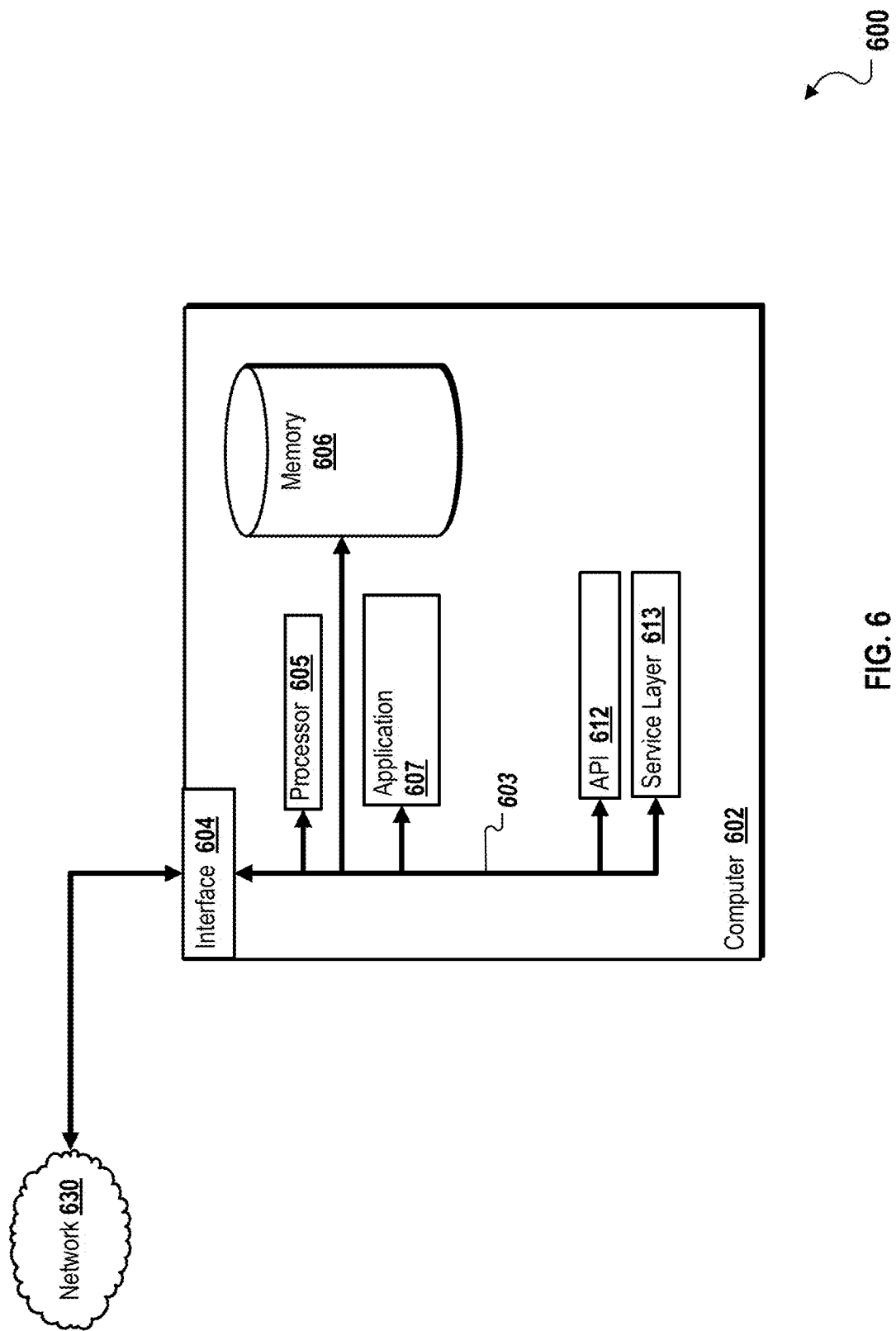
FIG. 6 is a block diagram of an exemplary computer used in the exemplary optical system of FIG. 4 according to an implementation.

FIG. 6 is a block diagram 600 of an exemplary computer 602 used in the exemplary optical system 400 of FIG. 4 (or any other figure and associated description of the instant disclosure) according to an implementation. The illustrated computer 602 is intended to encompass any computing device, including one or more processors or any other physical and/or virtual processing device suitable to perform one or more functions described in the disclosure. Additionally, the computer 602 may comprise an input device, such as a keypad, keyboard, touch screen, or other input device that can accept user information, and an output device, such as a display, speaker, or other output device that conveys information associated with the operation of the computer 602, including digital data, visual and/or audio information, or a GUI.

In general, the computer 602 can serve as a server, a client, a network component, a database, etc. of a computing system, and particularly as any component of the described optical system. The illustrated computer 602 can be communicably coupled with a network 630. In some implementations, one or more components of the computer 602 may be configured to operate within a cloud-computing-based environment.

At a high level, the computer 602 is an electronic computing device operable to receive, transmit, process, store, or manage data and information associated with the described optical system. According to some implementations, the computer 602 may also include or be communicably coupled with an application server, e-mail server, web server, caching server, streaming data server, business intelligence (BI) server, and/or other server.

The computer 602 can receive a request over network 630 from a client application, for example executing on another computer 602, and respond to the received request by processing the received request in an appropriate software application, for example application 607. In addition, requests may also be sent to the computer 602 from internal users (e.g., from a command console or by other appropriate access method), external or third parties, other automated applications, as well as any other appropriate entities, individuals, systems, or computers.

Each of the components of the computer 602 can communicate using a system bus 603. In some implementations, any and/or all the components of the computer 602, both hardware and/or software, may interface with each other and/or the interface 604 over the system bus 603 using an application programming interface (API) 612 and/or a service layer 613. The API 612 may include specifications for routines, data structures, and object classes. The API 612 may be either computer language-independent or -dependent and refer to a complete interface, a single function, or even a set of APIs. The service layer 613 provides software services to the computer 602 and/or the EDCS 600. The functionality of the computer 602 may be accessible for all service consumers using this service layer. Software services, such as those provided by the service layer 613, provide reusable, defined business functionalities through a defined interface. For example, the interface may be software written in JAVA, C++, or other suitable language providing data in extensible markup language (XML) format or other suitable format. While illustrated as an integrated component of the computer 602, alternative implementations may illustrate the API 612 and/or the service layer 613 as stand-alone components in relation to other components of the computer 602 and/or the described optical system. Moreover, any or all parts of the API 612 and/or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602 and/or the described optical system. The interface 604 can be used by the computer 602 for communicating with other systems in a distributed environment—including within the described optical system—connected to the network 630 (whether illustrated or not). Generally, the interface 604 comprises logic encoded in software and/or hardware in a suitable combination and operable to communicate with the network 630. More specifically, the interface 604 may comprise software supporting one or more communication protocols associated with communications such that the network 630 or interface's hardware is operable to communicate physical signals within and outside of the described optical system.

The computer 602 includes a processor 605. Although illustrated as a single processor 605 in FIG. 6, two or more processors may be used according to particular needs, desires, or particular implementations of the computer 602 and/or the described optical system. Generally, the processor 605 executes instructions and manipulates data to perform the operations of the computer 602. Specifically, the processor 605 executes the functionality required for magnification of a digital image without image quality deterioration or reduction.

The computer 602 also includes a memory 606 that holds data for the computer 602 and/or other components of the described optical system. Although illustrated as a single memory 606 in FIG. 6, two or more memories may be used according to particular needs, desires, or particular implementations of the computer 602 and/or the described optical system. While memory 606 is illustrated as an integral component of the computer 602, in alternative implementations, memory 606 can be external to the computer 602 and/or the described optical system.

The application 607 is an algorithmic software engine providing functionality according to particular needs, desires, or particular implementations of the computer 602 and/or the described optical system, particularly with respect to functionality required for magnification of a digital image without image quality deterioration or reduction. Further, although illustrated as a single application 607, the application 607 may be implemented as multiple applications 607 on the computer 602. In addition, although illustrated as integral to the computer 602, in alternative implementations, the application 607 can be external to the computer 602 and/or the described optical system.

There may be any number of computers 602 associated with, or external to, the described optical system and communicating over the network 630. Further, the term "client," "user," and other appropriate terminology may be used interchangeably as appropriate without departing from the scope of this disclosure. Moreover, this disclosure contemplates that many users may use one computer 602, or that one user may use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example, LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface including, but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. An optical system comprising:
    a lens constructing an image of articles which are in a field-of-view of an image acquisition sensor which converts radiant energy into an electrical signal;
    electronic components associated with an image processing electronic board that convert the electrical signal from the image acquisition sensor into a digital signal;

a micro display converting the digital signal into a video image displayed on the micro display, wherein micro-display pixel density is of a higher resolution than a resolution of acquisition sensor pixel density, and wherein each pixel of the micro display comprises a plurality of monochrome sub-pixels, the monochrome sub-pixels of a smaller size than pixels of the image acquisition sensor and the plurality of monochrome sub-pixels used by a matrix control system to increase the resolution of the micro display and to permit magnification of the video image displayed on the micro display without cropping the video image; and an eyepiece through which the video image from the micro-display image is projected.

2. The optical system of claim 1, wherein a linear dimension of the image acquisition sensor remains constant.

3. The optical system of claim 1, wherein each monochrome sub-pixel can be used as a separate pixel or in combination with other monochrome sub-pixels to construct the video image.

4. The optical system of claim 1, wherein the dimension of the video image is smaller in dimension than an active area of the micro display allocated for imaging.

5. The optical system of claim 1, wherein the optical system is used as a sight in a guidance system, firearm, tracking system, telescope, monocular, binocular, or night viewing device.

6. The optical system of claim 1, wherein a focal length between the eyepiece and a corresponding lens between the eyepiece and the micro display is fixed.

7. The optical system of claim 1, wherein the eyepiece is configured to encompass a maximum linear field value associated with the micro display.

8. The optical system of claim 1, wherein a digital signal corresponding to a pixel, can be switched to instead correspond with a particular sub-pixel.

9. The optical system of claim 1, wherein a sub-pixel diagonal dimension is two times smaller than a pixel diagonal dimension.

10. The optical system of claim 2, wherein a sub-pixel optimum minimum diagonal dimension is not more than 5 μm and a pixel cluster diagonal dimension is not more than 10 μm.

11. The optical system of claim 9, wherein the micro display can be switched from using a 5 μm sub-pixel to using a 10 μm pixel in order to permit continued magnification to an active area of the micro display.

12. A computer-implemented method, comprising:
receiving a digital signal encoded with an initial resolution, the digital signal constructed from visual data collected by an image acquisition sensor;

constructing a video image from the digital signal to display on a micro display of an optical system, wherein an initial linear dimension of the video image is smaller than a linear dimension of an active area of the micro display allocated for imaging;

initiating display of the video image on the micro display, wherein the video image is displayed using a plurality of monochrome sub-pixels configured to act as independent pixels for display of the video image, each monochrome sub-pixel a smaller size than a pixel of the image acquisition sensor and each monochrome sub-pixel associated with a group of other monochrome sub-pixels that form a single pixel on the micro display;

receiving a magnification request for the video image on the micro display;

adjusting the video image on the micro display using a matrix control system, the matrix control system increasing a linear dimension of the video image on the micro display by combining groups of monochrome sub-pixels of the plurality of monochrome sub-pixels where each group of monochrome sub-pixels collectively represents a single pixel of the video image at the initial resolution; and projecting the adjusted video image through an eyepiece.

13. The method of claim 12, wherein overall micro-display pixel density is of a higher resolution than a resolution of image acquisition sensor pixel density.

14. The method of claim 12, wherein the linear dimension of the image acquisition sensor remains constant.

15. The method of claim 12, wherein a sub-pixel optimum minimum diagonal dimension is not more than 5 μm and a pixel cluster diagonal dimension is not more than 10 μm.

16. The method of claim 12, wherein a focal length between the eyepiece and a corresponding lens between the eyepiece and the micro display is fixed.

17. The method of claim 12, wherein the eyepiece is configured to encompass a maximum linear field value associated with the micro display.

18. The method of claim 12, comprising switching the digital signal corresponding to a pixel to instead correspond with a particular sub-pixel to reduce video image size.

19. The method of claim 12, wherein a sub-pixel diagonal dimension is two times smaller than a pixel diagonal dimension.

20. The method of claim 19, comprising switching the micro display from using a 5 μm sub-pixel to using a 10 μm pixel in order to permit continued magnification to an active area of the micro display.

* * * * *